United States Patent Office 2,986,571
Patented May 30, 1961

---

2,986,571

NON-HYGROSCOPIC CHOLINE SALT

Osamu Ohodaira, Sakai-shi, Japan, assignor to Shionogi & Co., Ltd.

No Drawing. Filed July 9, 1959, Ser. No. 825,878

1 Claim. (Cl. 260—395)

This invention relates to a new salt of choline and to products containing the same.

Choline, (β-hydroxyethyl) trimethylammonium hydroxide, is widely used in pharmaceutical preparations and in the field of nutrition, usually in the form of one of its salts, such as choline chloride. The material has a strong odor and is extremely hygroscopic, making it unpleasant to handle in manufacturing operations. Owing to the extreme hygroscopicity of choline chloride, it attracts moisture to preparations containing it to the extent that in some cases the powdered material is transformed into a paste which makes it impossible to handle in powder measuring devices, in weighing operations and the like. This tendency is particularly undesirable in filling soft gelatin capsules with powdered preparations. In this operation the powder in the form of the various vitamins including those such as thiamine, riboflavin, niacinamide, pyridoxine, ascorbic acid, vitamin $B_{12}$, and sometimes mineral salts are intimately mixed, measured in a powder measuring device and encapsulated in soft gelatin. When substantial amounts of choline chloride are present and under conditions of high humidity, it is impossible to carry out this operation.

Choline salts are also used in nutrition, for example, as adjuncts to animal and poultry feeds. In such instances, the hygroscopic nature of the choline salts that are commonly available makes uniform mixing difficult and the preparation otherwise unsatisfactory.

Also because of the hygroscopic nature of most presently available choline salts the salts tend to liquify, and the undersirable odor of the material becomes more pronounced than normal and makes the product less desirable for handling the use.

Attempts have been made to overcome the hygroscopicity of choline by forming certain salts which are less hygroscopic than is choline chloride, for example, choline bitartrate, choline borate, choline dihydrogen citrate, choline bicarbonate and choline chloride carbamate. These products, however, are more hygroscopic than desirable, and there is a need for a better product for pharmaceutical manufacturing operations.

The present invention provides an improved, less hygroscopic choline salt, which is a free flowing powder even at high relative humidities, and it can be handled by ordinary measuring and encapsulating equipment without special precautions being required on account of the humidity. Furthermore, the product can be used with other vitamins of the type previously mentioned and can be enclosed in soft gelatin capsules without damage to the capsule or without resulting in undue chemical reaction between the components of the encapsulated mixture as a result of excess moisture content drawn therein by a hygroscopic material.

The new non-hygroscopic salt of the present invention is one prepared by reacting a water-soluble choline salt with a water-soluble salt of 4',4''-dihydroxytriphenylmethane-2-carboxylic acid. As a water-soluble choline salt may be used the chloride, bitartrate, borate, dihydrogen citrate, bicarbonate, chloride carbamate and the like. As a water-soluble salt of 4',4''-dihydroxytriphenylmethane-2-carboxylic acid may be used the alkali metal salt such as the sodium salt and the potassium salt. The reaction may be effected in water or water-lower alcohol, the choline salt and the salt of 4',4''-dihydroxytriphenylmethane-2-carboxylic acid being taken in equimolar quantities. The product precipitated from solution is fairly pure and becomes finished goods merely by washing with water. But, if desirable, it may be recrystallized from water or water-lower alcohol in order to obtain the high quality goods.

Illustration of the process will be given in the following example:

*Example*

The solution of 0.4 mol. of choline bitartrate in a little water was added to the solution of 0.4 mol. of 4',4''-dihydroxytriphenylmethane-2-carboxylic acid and 0.8 mol. of sodium hydroxide in 800 ml. water. This was stirred and warmed on a water bath. On standing a white, crystalline product was precipitated. The precipitate was recrystallized from water to give 0.396 mol. of monohydrate of choline 4',4''-dihydroxytriphenylmethane-2-carboxylate melting at 165–205° C. and decomposing at 235–243° C. with vesicating.

*Analysis.*—Calcd. for $C_{25}H_{29}NO_5 \cdot H_2O$; C, 68.01; H, 7.08; N, 3.17; O, 21.74; ($H_2O$, 4.08). Found: C, 68.06; H, 7.09; N, 3.48; O, 21.37; ($H_2O$, 3.90).

The subject matter of the present invention is shown by the chemical formula

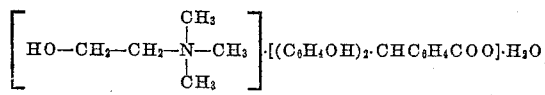

and is white, crystalline, free flowing powders which make it easily adaptable for accurate compounding into powders and especially for use in gelatin capsules. It remains at approximately 100% relative humidity for a long period of time and is much better in this respect than other choline salts previously reported.

It will be understood that variations in the procedure described above may be made by those skilled in the art. Normally, it is preferred to conduct the reaction in essentially aqueous conditions. Aliphatic alcohols and other water miscible solvents may be used in whole or in part to speed up the dissolution of the reactants. Also the reaction may be warmed if desired to hasten the completion of the reaction.

What is claimed is:

Choline 4',4''-dihydroxytriphenylmethane-2-carboxylate.

No references cited.